US011582911B2

(12) United States Patent
Mixon et al.

(10) Patent No.: US 11,582,911 B2
(45) Date of Patent: Feb. 21, 2023

(54) CHOPPER DRUM SYSTEM AND METHOD WITH IMPROVED BLADE CONFIGURATION

(71) Applicant: DEERE & COMPANY, Moline, IL (US)

(72) Inventors: Dusk S. Mixon, Thibodaux, LA (US); Surfraj Fattepur, Pune (IN); Guy Burch, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 323 days.

(21) Appl. No.: 16/899,936

(22) Filed: Jun. 12, 2020

(65) Prior Publication Data

US 2021/0386017 A1  Dec. 16, 2021

(51) Int. Cl.
| | |
|---|---|
| *A01D 45/10* | (2006.01) |
| *B02C 18/18* | (2006.01) |
| *A01D 34/42* | (2006.01) |
| *A01D 43/08* | (2006.01) |
| *A01D 34/44* | (2006.01) |
| *A01D 34/49* | (2006.01) |
| *A01D 34/52* | (2006.01) |

(52) U.S. Cl.
CPC ............. *A01D 45/10* (2013.01); *A01D 34/42* (2013.01); *A01D 34/44* (2013.01); *A01D 34/49* (2013.01); *A01D 34/52* (2013.01); *A01D 43/08* (2013.01); *B02C 18/18* (2013.01)

(58) Field of Classification Search
CPC . B02C 18/18; B02C 18/142; A01F 29/00–22; A01D 45/10; A01D 43/08; A01D 43/081; A01D 41/1243; A01D 34/42; A01D 34/44; A01D 34/49; A01D 34/52
See application file for complete search history.

(56) References Cited

U.S. PATENT DOCUMENTS

| | | | | |
|---|---|---|---|---|
| 8,615,978 | B2 * | 12/2013 | Hinds | A01D 45/10 |
| | | | | 56/500 |
| 9,433,149 | B2 * | 9/2016 | Mixon | A01D 45/10 |
| 10,076,082 | B2 * | 9/2018 | Fattepur | A01F 29/095 |
| 10,986,779 | B2 * | 4/2021 | Lawn | A01D 45/10 |

(Continued)

FOREIGN PATENT DOCUMENTS

| | | | | |
|---|---|---|---|---|
| WO | WO-2018037543 | A1 * | 3/2018 | ............. A01D 45/10 |
| WO | WO-2021049476 | A1 * | 3/2021 | |

*Primary Examiner* — Adam J Behrens
(74) *Attorney, Agent, or Firm* — Taft Stettinius & Hollister LLP; Stephen F. Rost (57) ABSTRACT

A chopper system and method for cutting crop material with a rotating first drum having first blades and a counter-rotating second drums having second blades. Blade pairs with one first blade and one second blade contact one another and cut the crop material. The blades of each blade pair contact one another for at least ten degrees of rotation. The blades can have beveled cutting edges, and the blade pairs can make bevel to bevel contact. The initial contact of the blade pairs during each rotation can form a swipe angle of 15 degrees or less. The initial contact of the blade pairs during each rotation can have the acute end of the first blade contact the second blade near the middle of the beveled edge. During each rotation, the acute end of the second blade can contact the back of the first blade.

18 Claims, 7 Drawing Sheets

(56) References Cited

U.S. PATENT DOCUMENTS

| | | | |
|---|---|---|---|
| 2013/0111871 A1* | 5/2013 | Hinds | B02C 18/18 56/500 |
| 2015/0327437 A1* | 11/2015 | Mixon | A01D 45/10 241/235 |
| 2016/0235010 A1* | 8/2016 | Fattepur | A01F 29/06 |
| 2018/0092306 A1* | 4/2018 | Burch | A01D 45/10 |
| 2018/0125005 A1* | 5/2018 | Lawn | A01D 45/10 |

\* cited by examiner

CHOPPER DRUM SYSTEM AND METHOD WITH IMPROVED BLADE CONFIGURATION

FIELD OF THE DISCLOSURE

The present disclosure relates to chopping systems of sugar cane harvesters, and more specifically relates to chopper drum arrangements and chopper blades for sugar cane harvesters.

BACKGROUND

The sugar cane stalk chopping systems in most sugar cane harvesters include a chopper drum arrangement comprising a pair of counter-rotating drums to which cutting knives are attached. The chopper system is at the heart of the cane harvester. In early chopper drum arrangements, the blades did not overlap each other so no blade-on-blade contact occurred. This arrangement did not work well for cutting green leaves when the blades were new and, as the blades wore, they did not completely severe the cane stalks. Later improvements included the overlapping of the path traced by the cutting edges of the blades carried by one drum with the path traced by the cutting edges of the blades carried by the other drum with a slight clearance between the cutting edges as they intermeshed. This arrangement also had difficulties cutting green leaves.

Most chopper drum arrangements have been constructed so that beveled surfaces of the cutting edges of the blades are either opposed to each other, i.e., arranged bevel-to-bevel, or the beveled surface of one blade is opposed to the backside of the other blade. In both cases, the blades make hard contact with each other to help cut green leaves and stalks of the sugar cane. The bevel-to-bevel arrangement can be self-sharpening which improves the cutting of green leaves and stalks as the beveled cutting edges of the blades wear or get chipped. Chopper blades are one of the items of sugar cane harvesters that require relatively frequent maintenance and replacement. The chopper blades can be costly and have to be maintained or replaced to get more clean cut sugar cane with less trash.

It would be desirable to have a chopper drum configuration that can help with one or more of extending the chopper blade life, improving cut quality, and/or promoting self-sharpening of the chopper blades.

SUMMARY

A chopper system for cutting crop material is disclosed that includes first and second chopper drums with multiple first chopper blades attached to the first chopper drum, and multiple second chopper blades attached to the second chopper drum. The first and second chopper blades form a plurality of blade pairs with a first blade of the first chopper blades and a second blade of the second chopper blades. The first and second chopper drums are configured to counter-rotate to cause the first and second blades of each of the blade pairs to contact one another and cut the crop material. The first and second blades of each of the blade pairs contact one another for at least ten degrees of rotation of the first and second chopper drums. The first and second blades of each of the blade pairs can contact one another for twelve degrees of rotation of the first and second chopper drums. Each of the first and second chopper blades can have a beveled cutting edge with an acute end and an obtuse end, where the beveled cutting edges of the first chopper blades are opposed to the beveled cutting edges of the second chopper blades such that for each of the blade pairs the beveled cutting edge of the first blade contacts the beveled cutting edge of the second blade.

The blade pairs can be configured such that when the first and second blades of each of the blade pairs initially make contact during each rotation of the first and second chopper drums, the beveled cutting edges of the first and second blades form a swipe angle of 15 degrees or less. The blade pairs can be configured such that when the first and second blades of each of the plurality of blade pairs initially make contact during each rotation of the first and second chopper drums, the beveled cutting edges of the first and second blades form a swipe angle between 10 and 15 degrees. The blade pairs can be configured such that when the first and second blades of each of the plurality of blade pairs initially make contact during each rotation of the first and second chopper drums the beveled cutting edges of the first and second blades form a swipe angle between 11 and 12.5 degrees.

The blade pairs can be configured such that when the first and second blades of each of the blade pairs initially make contact during each rotation of the first and second chopper drums, the acute end of the beveled cutting edge of the first blade contacts the second blade near the middle of the beveled cutting edge of the second blade.

The blade pairs can be configured such that while the first and second blades of each of the plurality of blade pairs make contact during each rotation of the first and second chopper drums, the acute end of the beveled cutting edge of the second blade contacts a back side of the first blade.

A chopping method for cutting crop material is disclosed that includes rotating a first chopper drum that includes first chopper blades attached to the first chopper drum; counter-rotating a second chopper drum that includes second chopper blades attached to the second chopper drum, the second chopper drum counter-rotating relative to the first chopper drum; cutting the crop material using blade pairs with a first blade of the first chopper blades and a second blade of the second chopper blades; causing the first and second blades of each of the blade pairs to contact one another to cut the crop material during counter-rotation of the first and second chopper drums; and for each of the blade pairs, having the first and second blades of the blade pair contact one another during at least ten degrees of rotation of the first and second chopper drums. The chopping method can include, having the first and second blades of the blade pair contact one another during twelve degrees of rotation of the first and second chopper drums. Each of the first and second chopper blades can have a beveled cutting edge with an acute end and an obtuse end, and the beveled cutting edges of the first chopper blades can be opposed to the beveled cutting edges of the second chopper blades such that for each of the blade pairs the beveled cutting edge of the first blade contacts the beveled cutting edge of the second blade.

The chopping method can include for each of the blade pairs, at initial contact during each rotation of the first and second chopper drums, forming a swipe angle of 15 degrees or less between the beveled cutting edges of the first and second blades. The chopping method can include for each of the blade pairs, at initial contact during each rotation of the first and second chopper drums, forming a swipe angle between 10 and 15 degrees between the beveled cutting edges of the first and second blades. The chopping method can include for each of the blade pairs, at initial contact during each rotation of the first and second chopper drums, forming a swipe angle between 11 and 12.5 degrees between the beveled cutting edges of the first and second blades.

The chopping method can include for each of the blade pairs, at initial contact during each rotation of the first and second chopper drums, contacting the acute end of the beveled cutting edge of the first blade to the second blade near the middle of the beveled cutting edge of the second blade.

The chopping method can include for each of the plurality of blade pairs during each rotation of the first and second chopper drums, contacting the acute end of the beveled cutting edge of the second blade to a back side of the first blade.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
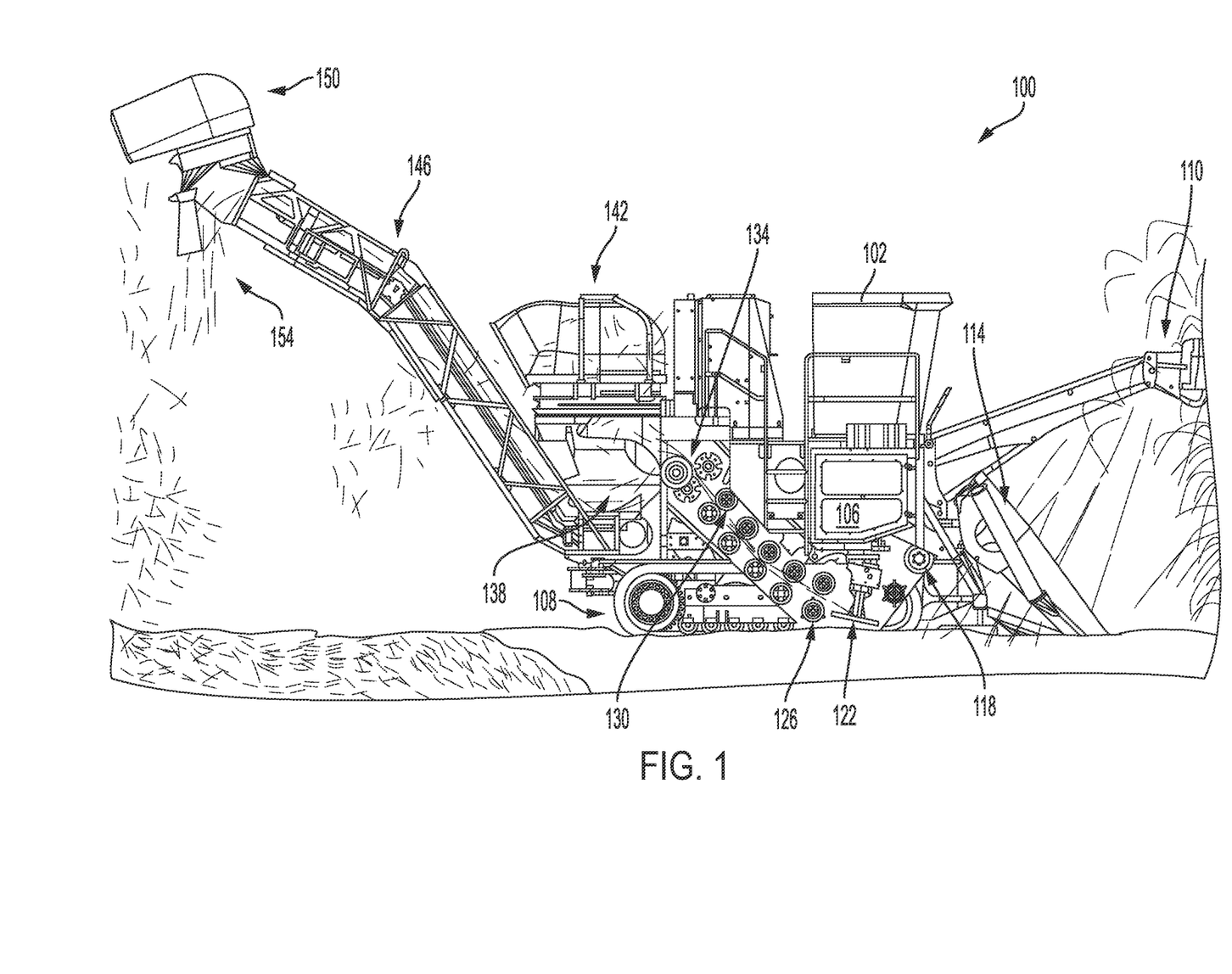
FIG. 1 illustrates an exemplary sugar cane harvester for harvesting rows of standing sugar cane.

FIG. 1 illustrates an exemplary sugar cane harvester 100 for harvesting rows of standing sugar cane. The exemplary sugar cane harvester 100 includes an operator cab 102, an engine 106, track assemblies 108, a cane topper 110, a crop divider 114, knockdown rollers 118, a base cutter 122, butt lifters 126, feed rollers 130, a chopper system 134, an elevator basket 138, a primary extractor chamber 142, an elevator 146, and a secondary extractor chamber 150. The engine 106 provides power for driving the track assemblies 108 and other driven components of the harvester 100. The operator cab 102 is mounted in a position for observing operation of the cane topper 110 and crop dividers 114. The cane topper 110 cuts off the leafy material at the top of the sugar cane, this leafy material has little or no sugar content. The crop dividers 114 help separate the rows of sugar cane plants and feed them to the knockdown rollers 118 and base cutter 122. The base cutter assembly 122 is located below the engine 106 and between the track assemblies 108 for each row of cane stalks, and knockdown rollers 118 are located ahead of the base cutter assembly 122 for orienting the cane stalks to be cut by the base cutter assemblies 122. The sugar cane is then fed cut end or base first by the butt lifters 126 into an upwardly and rearward oriented feed path defined between pairs of butt lifters 126 and feed rollers 130. The feed rollers 130 convey the stalks to the chopper system 134 to chop the stalks into billets and propel them across the primary extractor chamber 142 to the elevator 146. The primary extractor chamber 142 can include a fan to help separate leafy material from the billets. The elevator 146 conveys material from the elevator basket 138 below the primary extractor chamber 142 to the secondary extractor chamber 150 which can also include a fan to blow leafy material out from the billets. The billets 154 can then drop from the secondary extractor chamber 150 into a wagon (not shown).

Figure 2:
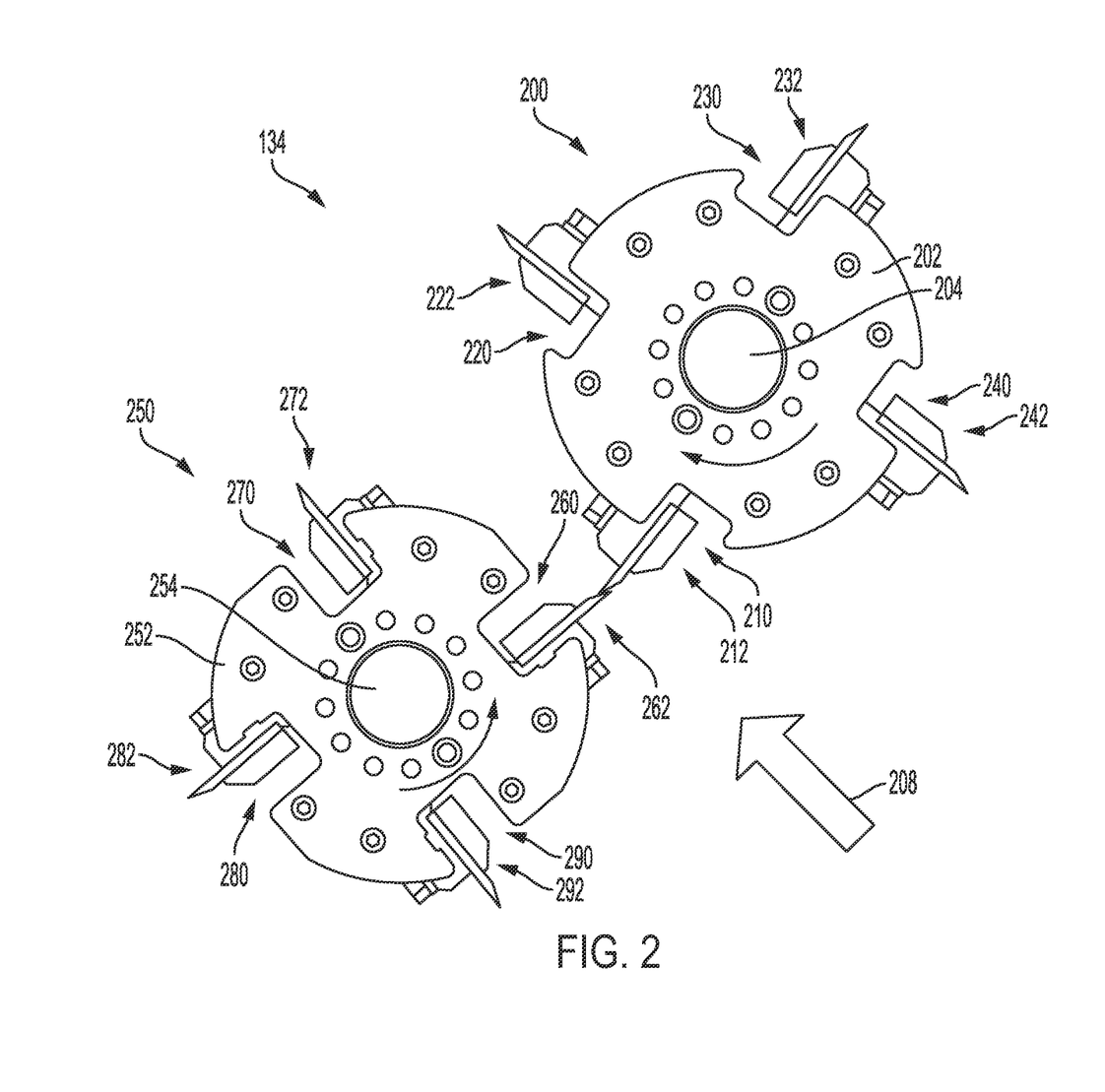
FIG. 2 illustrates a side view of counter-rotating upper and lower blade drums in an exemplary chopper system.

The chopper system 134 is one of the primary systems of the cane harvester 100. If the chopper system 134 is not working well, then the cane harvester 100 is not performing well. FIG. 2 illustrates a side view of a pair of blade drums 200, 250 in an exemplary chopper system 134. The two blade drums 200, 250 are counter-rotating to pull the sugar cane through the chopper system 134 and into the elevator basket 138. In this view, the upper drum 200 rotates clockwise and the lower drum 250 rotates counterclockwise. Arrow 208 indicates the direction of the sugar cane as it enters the chopper system 134.

The upper blade drum 200 includes an upper drum hub 202 that is attached to an upper axle 204 such that the upper drum hub 202 rotates with the upper axle 204. The upper blade drum hub 202 also includes four upper recesses 210, 220, 230, 240 and each upper recess 210, 220, 230, 240 includes an upper blade assembly 212, 222, 232, 242. The first upper recess 210 includes the first upper blade assembly 212; the second upper recess 220 includes the second upper blade assembly 222; the third upper recess 230 includes the third upper blade assembly 232; and the fourth upper recess 240 includes the fourth upper blade assembly 242.

The lower blade drum 250 includes a lower drum hub 252 that is attached to a lower axle 254 such that the lower drum hub 252 rotates with the lower axle 254. The lower blade drum hub 252 also includes four lower recesses 260, 270, 280, 290 and each lower recess 260, 270, 280, 290 includes a lower blade assembly 262, 272, 282, 292. The first lower recess 260 includes the first lower blade assembly 262; the second lower recess 270 includes the second lower blade assembly 272; the third lower recess 280 includes the third lower blade assembly 282; and the fourth lower recess 290 includes the fourth lower blade assembly 292.

The upper blade assemblies 212, 222, 232, 242 of the upper blade drum 200 cooperate with the lower blade assemblies 262, 272, 282, 292 of the lower blade drum 250 to cut the sugar cane into billets. In this exemplary embodiment, the upper and lower drums 210, 250 each have four blade assemblies. Each of the blade drums can have more or less blade assemblies, for example 2, 5, 6, 8, etc., depending on desired billet size and other parameters of the chopper system design.

Figure 3:
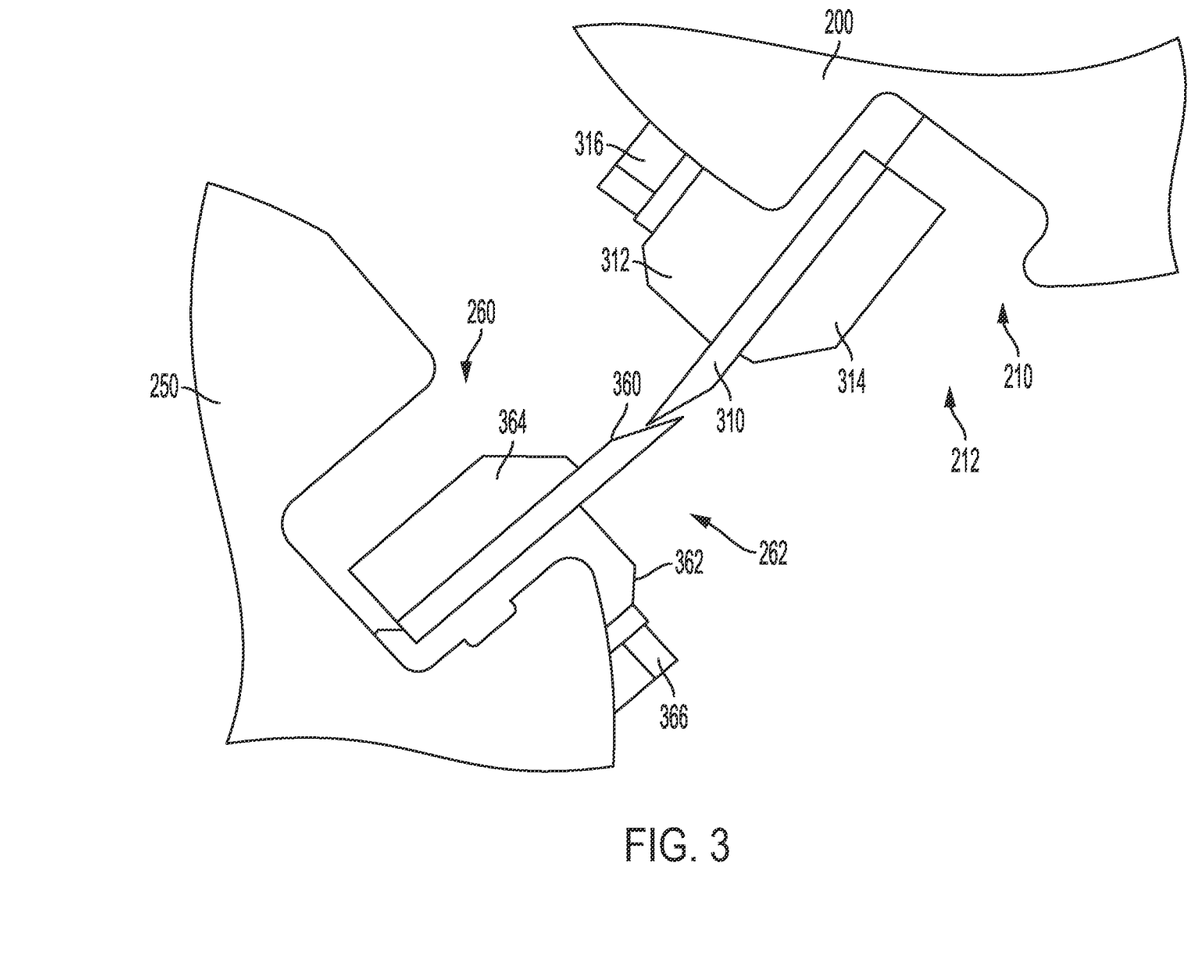
FIG. 3 illustrates a more-detailed, close-up view of the first pair of blade assemblies of the upper and lower blade drums of FIG. 2 coming together where sugar cane would be chopped.

FIG. 3 illustrates a more-detailed, close-up view of the first pair of blade assemblies 210, 260 of the upper and lower blade drums 200, 250, respectively, coming together where sugar cane would be chopped. The first blade assembly 210 of the upper blade drum 200 includes a first upper blade 310, a first upper spacer 312, a first upper support 314 and a first upper fastener 316. The first upper spacer 312 positions the first upper blade 310 relative to one side of the first upper recess 210. The first upper support 314 sandwiches the first upper blade 310 against the first upper spacer 312 to help prevent bending or movement of the first upper blade 310. The first upper fastener 316 fastens the components of the first upper blade assembly 212 together and in place in the first upper recess 210 of the upper blade drum 200.

Similarly, the first blade assembly 260 of the lower blade drum 250 includes a first lower blade 360, a first lower spacer 362, a first lower support 364 and a first lower fastener 366. The first lower spacer 362 positions the first lower blade 360 relative to one side of the first lower recess 260. The first lower support 364 sandwiches the first lower blade 360 against the first lower spacer 362 to help prevent bending or movement of the first lower blade 360. The first lower fastener 366 fastens the components of the first lower blade assembly 262 together and in place in the first lower recess 260 of the lower blade drum 250. As shown in FIG. 2, each of the upper and lower blade assemblies 212, 222, 232, 242, 262, 272, 282, 292 includes a blade, a spacer, a support and a fastener configured to cooperate as described above for their associated blade assembly and drum recess.

The size, shape, angle and other parameters of the spacers, supports and fasteners of the upper and lower blade assemblies in cooperation with the shape and angle of the recesses of the upper and lower blade drums can be used to determine the overlap and the relative angles of the upper and lower blade pairs as they come together to cut the sugar cane.

The same description applies to the second pair of blade assemblies 220, 270; the third pair of blade assemblies 230, 280; and the fourth pair of blade assemblies 240, 290 of the upper and lower blade drums 200, 250, respectively, cooperating to chop the sugar cane as the upper and lower blade drums 200, 250 rotate in opposite directions. In the configuration shown in FIGS. 2 and 3, the upper blade drum 200 rotates clockwise and the lower blade drum 250 rotates counterclockwise. The upper-lower blade pair 310, 360 of the first pair of blade assemblies 210, 260 cooperate to cut the sugar cane as it passes between the upper and lower blade drums 210, 250. As the upper and lower blade drums 210, 250 continue to rotate the upper-lower blade pair of the second pair of blade assemblies 220, 270, then the upper-lower blade pair of the third pair of blade assemblies 230, 280, and then the upper-lower blade pair of the fourth pair of blade assemblies 240, 290 cooperate to cut the sugar cane as it passes between the upper and lower blade drums 210, 250; and then the cutting continues starting back with upper-lower blade pair 310, 360 of the first pair of blade assemblies 210, 260.

The mesh of each upper-lower blade pair of the counter-rotating blade drums 210, 250 is important for cleaning the sugar cane, removing the unwanted leafy material. Having the upper-lower blade pairs cut completely through the leafy material helps with removal of the unwanted leafy material from the sugar can billets, which requires precision in the mesh of the upper-lower blade pairs. As the blades wear, the cleaning performance can begin to degrade which can impact sugar recovery, mill cleaning requirements, and truck load density. To counteract this, the upper blade drum 200 can be rotated relative to the lower blade drum 250 so that the mesh of the upper-lower blade pairs of the counter-rotating blade drums 210, 250 continue to provide the desired cleaning performance by cutting through the leafy material of the sugar cane.

Figure 4:
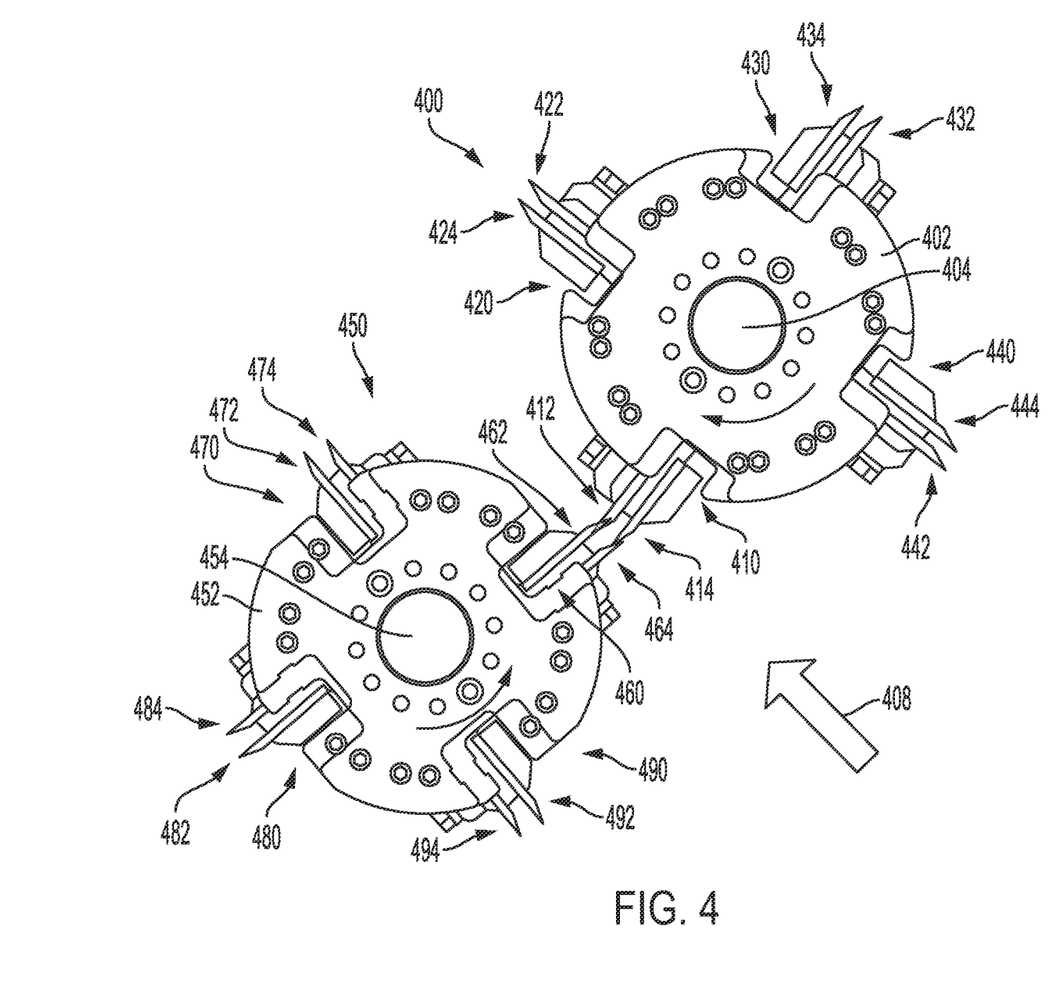
FIG. 4 illustrates a comparison of placement and geometry of blades in prior configurations versus placement and geometry of blades in an exemplary improved configuration for counter-rotating blade drums.

FIGS. 4 and 5A-5E illustrate a comparison of the placement and geometry of the blades in a typical prior configuration versus an exemplary improved blade configuration placement and geometry disclosed herein. FIG. 4 shows a side view of a pair of counter-rotating blade drums 400, 450 where the upper drum 400 rotates clockwise and the lower drum 450 rotates counterclockwise.

The upper blade drum 400 includes an upper drum hub 402 that is attached to an upper axle 404 such that the upper drum hub 402 rotates with the upper axle 404. The upper blade drum hub 402 also includes four upper recesses 410, 420, 430, 440. Each upper recess 410, 420, 430, 440 is shown with both a prior configuration blade assembly 412, 422, 432, 442, respectively, and an improved configuration blade assembly 414, 424, 434, 444, respectively. In practice, only the improved configuration blade assemblies 414, 424, 434, 444 would be present but this illustration helps show the contrast with prior configurations.

The lower blade drum 450 includes a lower drum hub 452 that is attached to a lower axle 454 such that the lower drum hub 452 rotates with the lower axle 454. The lower blade drum hub 452 also includes four lower recesses 460, 470, 480, 490. Each lower recess 460, 470, 480, 490 is shown with both a prior configuration blade assembly 462, 472, 482, 492, respectively, and an improved configuration blade assembly 464, 474, 484, 494, respectively. In practice, only the improved configuration blade assemblies 464, 474, 484, 494 would be present but this illustration helps show the contrast with prior configurations.

As shown in FIG. 4, the improved blade configuration enables the upper-lower blade pairs to catch the sugar cane earlier as it travels up in the direction of arrow 408 from the feed rollers, which reduces the likelihood of cane crushing by the upper lower blade drums 400, 450 and their blade assemblies.

Figure 5A:
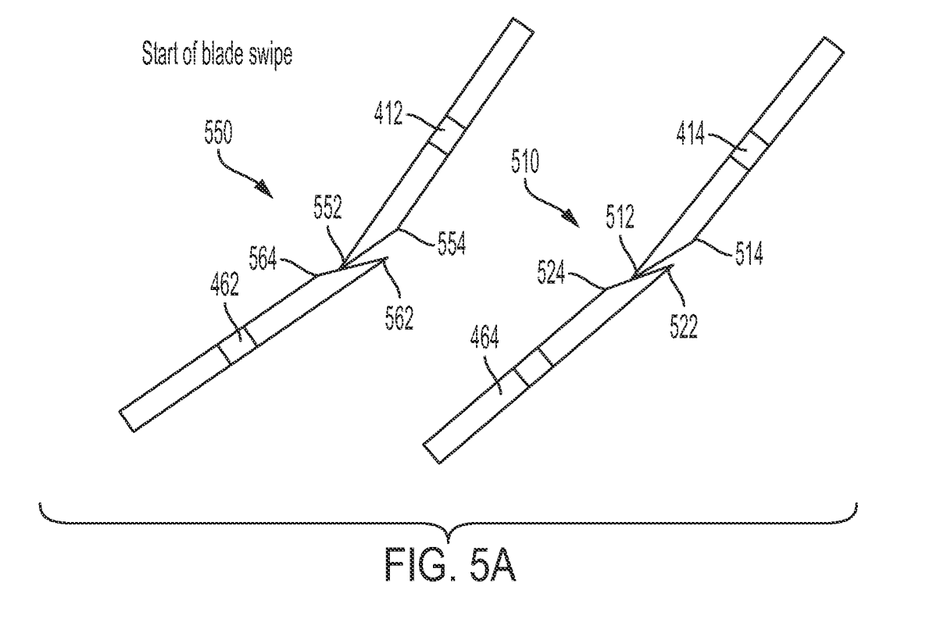
FIG. 5A illustrates a comparison of the swiping action at the start of blade swipe between an upper-lower blade pair in the improved blade configuration versus the prior blade configuration.
Figure 5B:
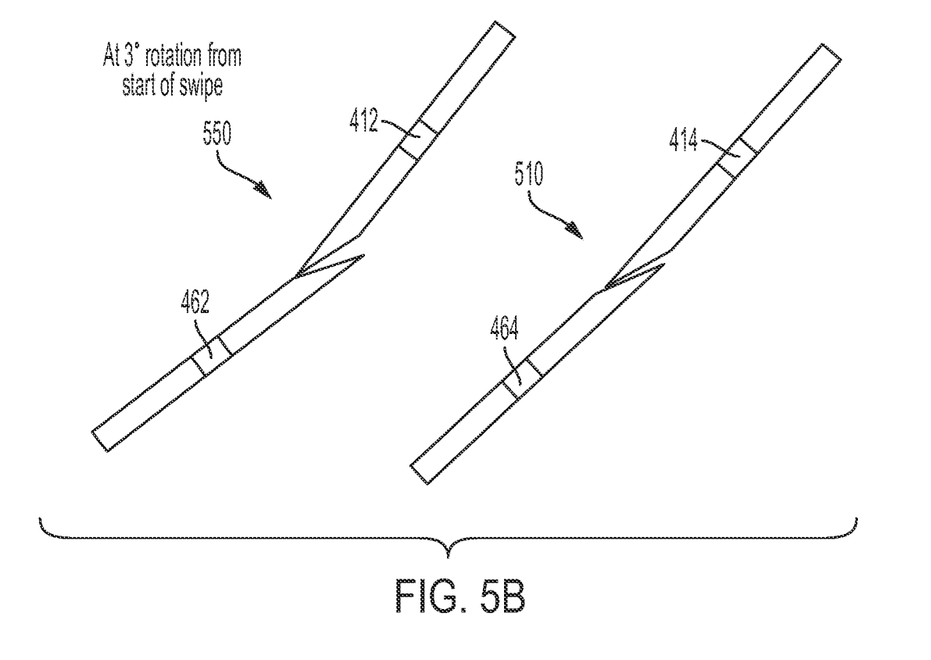
FIG. 5B illustrates a comparison of the swiping action at three (3) degrees after the start of blade swipe between an upper-lower blade pair in the improved blade configuration versus the prior blade configuration.
Figure 5C:
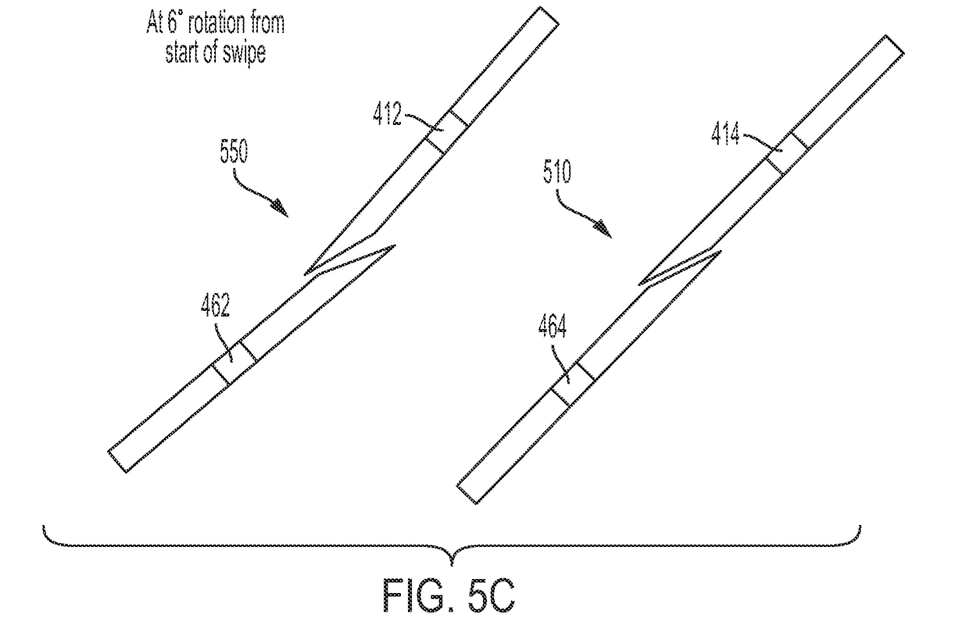
FIG. 5C illustrates a comparison of the swiping action at six (6) degrees after the start of blade swipe between an upper-lower blade pair in the improved blade configuration versus the prior blade configuration.
Figure 5D:
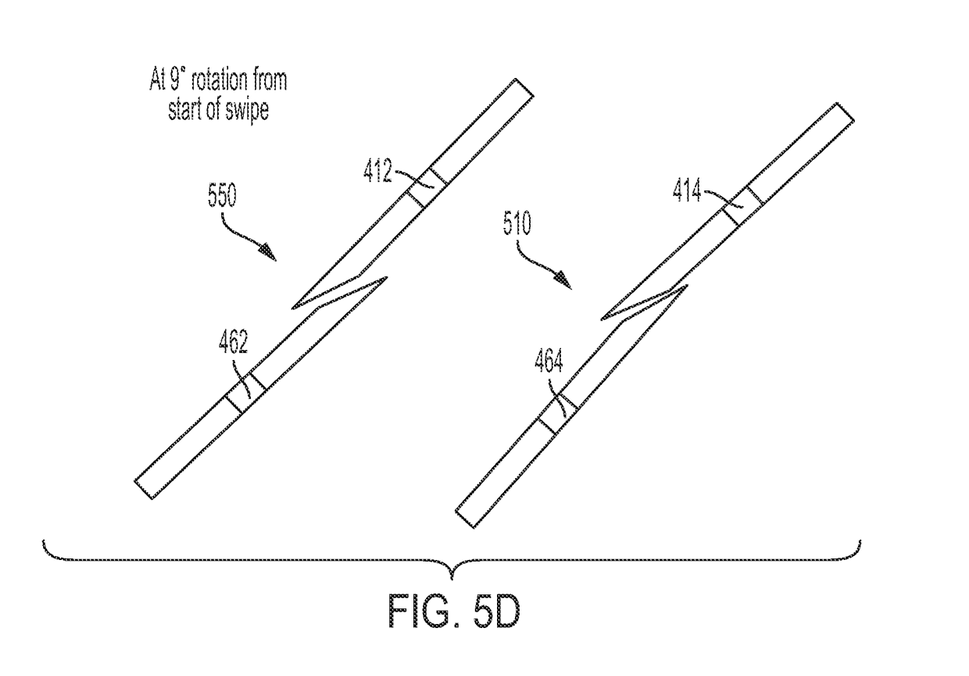
FIG. 5D illustrates a comparison of the swiping action at nine (9) degrees after the start of blade swipe between an upper-lower blade pair in the improved blade configuration versus the prior blade configuration.
Figure 5E:
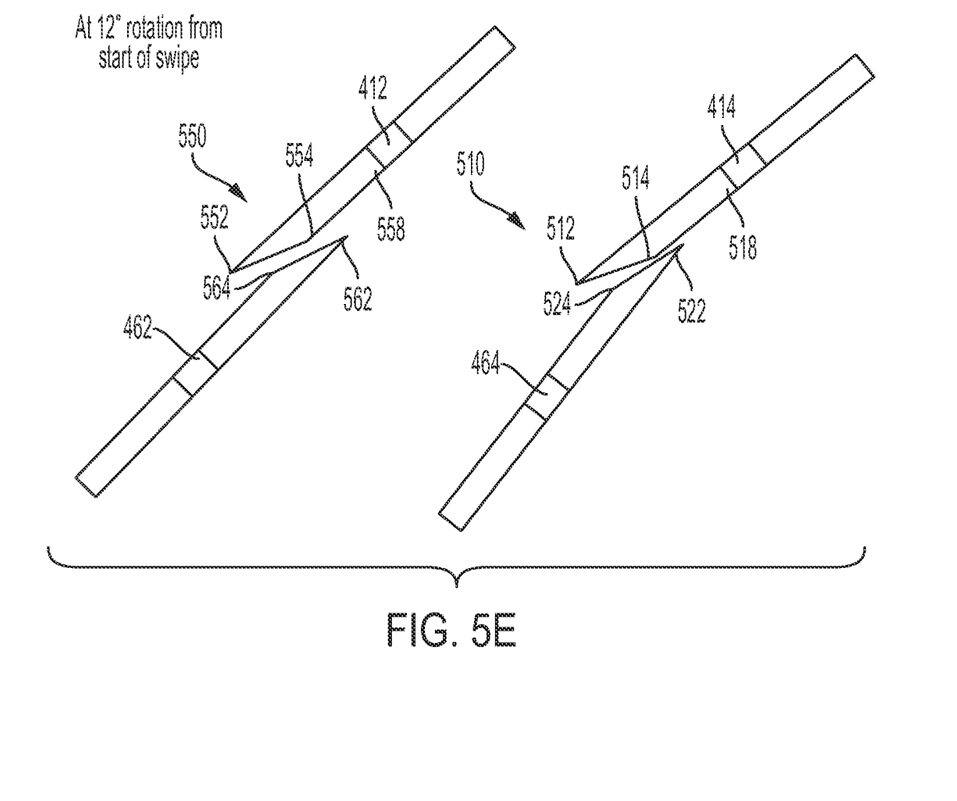
FIG. 5E illustrates a comparison of the swiping action at twelve (12) degrees after the start of blade swipe between an upper-lower blade pair in the improved blade configuration versus the prior blade configuration.

FIGS. 5A-5E illustrate a comparison of the progression of the swiping action between an upper-lower blade pair 414, 464 in the improved blade configuration 510 versus the swiping action between an upper-lower blade pair 412, 462 in a typical prior blade configuration 550, from start of the blade swipe (FIG. 5A) until 12 degrees of rotation from the start of blade swipe (FIG. 5E). For reference, FIGS. 5A and 5E also indicate the ends of the beveled edges of the blades in the improved and prior blade configurations. In the improved blade configuration 510, the beveled edge of the upper blade 414 has an acute end 512 and an obtuse end 514, and the beveled edge of the lower blade 464 has an acute end 522 and an obtuse end 524. In the prior blade configuration 550, the beveled edge of the upper blade 412 has an acute end 552 and an obtuse end 554, and the beveled edge of the lower blade 462 has an acute end 562 and an obtuse end 564.

The improved blade configuration 510 provides more blade swipe than the prior blade configuration 550. In the improved blade configuration 510, the lower blade 464 begins swiping the acute end 512 of the upper blade 414 at approximately half-way up the blade bevel (about 50% blade bevel) (see FIG. 5A), and the acute end 512 of the upper blade 414 moves along the bevel of the lower blade 464 towards the obtuse end 524 of the bevel of the lower blade 464, and the acute end 522 of the bevel of the lower blade 464 contacts the back side 518 of the upper blade 414 beyond 12 degrees rotation from start of blade swipe (see FIG. 5E). In the prior blade configuration 550, the lower blade 462 begins swiping the upper blade 412 further up the blade bevel (about 65% blade bevel) (see FIG. 5A), and the lower blade 462 separates from the upper blade 412 about 6 degrees rotation from start of blade swipe (see FIG. 5C). Thus, the improved blade configuration 510 provides a longer blade swipe than the prior blade configuration 550. The longer blade swipe can improve cutting and also blade self-sharpening.

The improved blade configuration 510 is also arranged so the tip or acute end 522 of the beveled edge of the lower blade 464 touches the back 518 of the upper blade 414 near the obtuse end 514 of the bevel of the upper blade 414. This touching of the tip or acute end 522 of the lower blade 464 to the back 518 of the upper blade 414 helps ensure cleaner cutting of the sugar cane even when the sugar cane is green. FIG. 5E illustrates, for the improved blade configuration 510, the tip 522 of the lower blade 464 touching the back 518 of the upper blade 414 near the obtuse end 514 of the bevel of the upper blade 414 just before the blades 414, 464 end their swipe. In contrast, in the prior blade configuration 550, the tip 562 of the lower blade 462 never touches the upper blade 412, no touching of the tip 562 of the lower blade 462 to the back 558 of the upper blade 412, which can compromise the cutting of the sugar cane and promote sugar cane crushing. The touching of the tip 522 of the lower blade 464 to the back 518 of the upper blade 414 in the improved blade configuration 510 helps ensure cleaner cutting of the sugar cane, including green sugar cane and sugar cane leafy material.

The improved blade configuration 510 is also arranged so that the angle of the blades when they come into contact (angle of impact) is shallower than in the prior blade configuration. The shallower angle of impact between the blades improves blade self-sharpening, and reduces the crushing or dulling impact of the tip of the upper blade digging into the bevel of the lower blade. See the shallower angle of impact in the improved blade configuration versus the prior blade configuration shown in FIG. 5A and FIG. 6 (described below).

The improved blade configuration 510 provides an extended blade life due to decreased blade dulling and self-sharpening of the blades. Extended blade life increases time between blade replacement or maintenance which reduces cost and increase operation ready time. The extended blade life is achieved in the improved blade configuration 510 due to a combination of the bevel-to-bevel blade contact, the shallower angle between the blades during the swiping action, the longer swipe and the running of the bevel and tip of the lower blade along the back of the upper blade during the swiping action.

Figure 6:
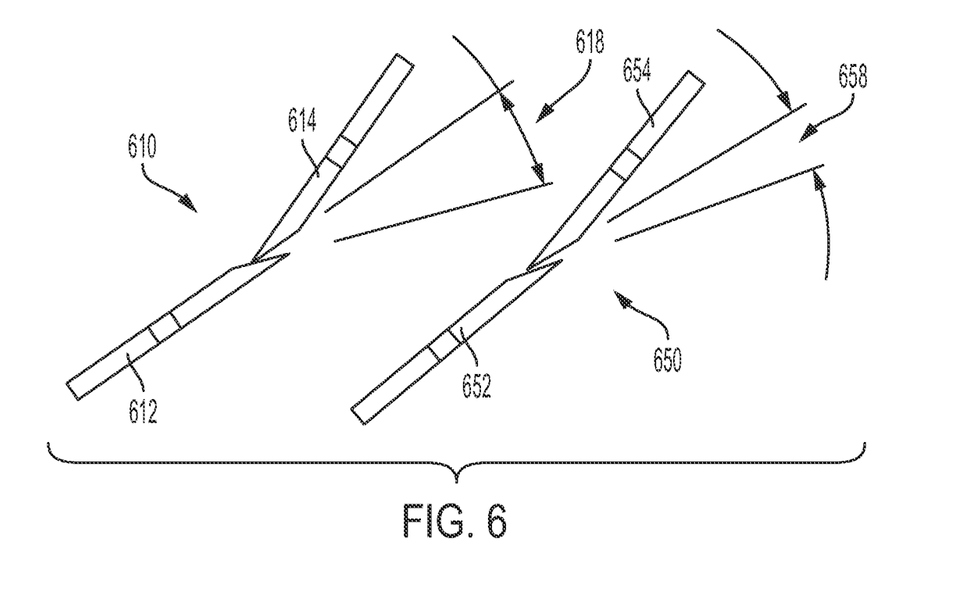
FIG. 6 illustrates an exemplary comparison of the swiping action between an upper-lower blade pair in an exemplary improved blade configuration versus the swiping action between an upper-lower blade pair in an exemplary prior blade configuration at the start of the blade swipe.

FIG. 6 illustrates an exemplary comparison of the swiping action between an upper-lower blade pair 652, 654 in an exemplary improved blade configuration 650 versus the swiping action between an upper-lower blade pair 612, 614 in an exemplary prior blade configuration 610 at the start of the blade swipe. The swipe angle 658 between the bevels of the upper-lower blade pair 652, 654 in the improved blade configuration 650 ranges between approximately 10 and 15 degrees, and can be between 11 and 12.5 degrees. In contrast, the swipe angle 618 between the bevels of the upper-lower blade pair 612, 614 in the prior blade configuration 610 is much larger ranging between approximately 22 and 25 degrees. The shallower swipe angle of the improved blade configuration 650 reduces blade wear and tear, improves blade self-sharpening and extends blade life versus the prior blade configuration 610.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A chopper system for cutting crop material, the chopper system comprising:
   a first chopper drum;
   a plurality of first chopper blades attached to the first chopper drum, each blade of the plurality of first chopper blades includes a straight beveled cutting edge that extends across the width of the blade from an acute end to an obtuse end;
   a second chopper drum;
   a plurality of second chopper blades attached to the second chopper drum, each blade of the plurality of second chopper blades includes a straight beveled cutting edge that extends across the width of the blade from an acute end to an obtuse end;
   wherein the plurality of first and second chopper blades form a plurality of blade pairs comprising a first blade of the plurality of first chopper blades and a second blade of the plurality of second chopper blades;
   wherein the first and second chopper drums are configured to counter-rotate to cause the first and second blades of each of the plurality of blade pairs to contact one another and cut the crop material;
   wherein the first and second blades of each of the plurality of blade pairs contact one another for at least ten degrees of rotation of the first and second chopper drums; and
   wherein the plurality of blade pairs are configured such that when the first and second blades of each of the plurality of blade pairs initially make contact during each rotation of the first and second chopper drums, the straight beveled cutting edges of the first and second blades form a swipe angle of 15 degrees or less.

2. The chopper system of claim 1, wherein the first and second blades of each of the plurality of blade pairs contact one another for twelve degrees of rotation of the first and second chopper drums.

3. The chopper system of claim 1, wherein the straight beveled cutting edges of the plurality of first chopper blades are opposed to the straight beveled cutting edges of the plurality of second chopper blades such that for each of the plurality of blade pairs the straight beveled cutting edge of the first blade contacts the straight beveled cutting edge of the second blade.

4. The chopper system of claim 3, wherein the plurality of blade pairs are configured such that when the first and second blades of each of the plurality of blade pairs initially make contact during each rotation of the first and second chopper drums, the straight beveled cutting edges of the first and second blades form a swipe angle between 10 and 15 degrees.

5. The chopper system of claim 3, wherein the plurality of blade pairs are configured such that when the first and second blades of each of the plurality of blade pairs initially make contact during each rotation of the first and second chopper drums, the straight beveled cutting edges of the first and second blades form a swipe angle between 11 and 12.5 degrees.

6. The chopper system of claim 3, wherein the plurality of blade pairs are configured such that when the first and second blades of each of the plurality of blade pairs initially make contact during each rotation of the first and second chopper drums, the acute end of the straight beveled cutting edge of the first blade contacts the second blade near the middle of the straight beveled cutting edge of the second blade.

7. The chopper system of claim 6, wherein the plurality of blade pairs are configured such that while the first and second blades of each of the plurality of blade pairs make contact during each rotation of the first and second chopper drums, the acute end of the straight beveled cutting edge of the second blade contacts a back side of the first blade.

8. The chopper system of claim 3, wherein the plurality of blade pairs are configured such that while the first and second blades of each of the plurality of blade pairs make contact during each rotation of the first and second chopper drums, the acute end of the straight beveled cutting edge of the second blade contacts a back side of the first blade.

9. The chopper system of claim 3, wherein
while the first and second blades of each of the plurality of blade pairs make contact during each rotation of the first and second chopper drums, the acute end of the straight beveled cutting edge of the second blade contacts a back side of the first blade.

10. A chopping method for cutting crop material, the chopping method comprising:
rotating a first chopper drum that includes a plurality of first chopper blades attached to the first chopper drum, each blade of the plurality of first chopper blades including a straight beveled cutting edge that extends across the width of the blade from an acute end to an obtuse end;
counter-rotating a second chopper drum that includes a plurality of second chopper blades attached to the second chopper drum, each blade of the plurality of second chopper blades including a straight beveled cutting edge that extends across the width of the blade from an acute end to an obtuse end, the second chopper drum counter-rotating relative to the first chopper drum;
cutting the crop material using a plurality of blade pairs comprising a first blade of the plurality of first chopper blades and a second blade of the plurality of second chopper blades;
causing the first and second blades of each of the plurality of blade pairs to contact one another to cut the crop material during counter-rotation of the first and second chopper drums;
for each of the plurality of blade pairs, having the first and second blades of the blade pair contact one another during at least ten degrees of rotation of the first and second chopper drums; and
for each of the plurality of blade pairs, at initial contact during each rotation of the first and second chopper drums, forming a swipe angle of 15 degrees or less between the straight beveled cutting edges of the first and second blades.

11. The chopping method of claim 10, further comprising for each of the plurality of blade pairs, having the first and second blades of the blade pair contact one another during twelve degrees of rotation of the first and second chopper drums.

12. The chopping method of claim 10, wherein the straight beveled cutting edges of the plurality of first chopper blades are opposed to the straight beveled cutting edges of the plurality of second chopper blades such that for each of the plurality of blade pairs the straight beveled cutting edge of the first blade contacts the straight beveled cutting edge of the second blade.

13. The chopping method of claim 12, further comprising for each of the plurality of blade pairs, at initial contact during each rotation of the first and second chopper drums, forming a swipe angle between 10 and 15 degrees between the straight beveled cutting edges of the first and second blades.

14. The chopping method of claim 12, further comprising for each of the plurality of blade pairs, at initial contact during each rotation of the first and second chopper drums, forming a swipe angle between 11 and 12.5 degrees between the straight beveled cutting edges of the first and second blades.

15. The chopping method of claim 12, further comprising for each of the plurality of blade pairs, at initial contact during each rotation of the first and second chopper drums, contacting the acute end of the straight beveled cutting edge of the first blade to the second blade near the middle of the straight beveled cutting edge of the second blade.

16. The chopping method of claim 15, further comprising for each of the plurality of blade pairs during each rotation of the first and second chopper drums, contacting the acute end of the straight beveled cutting edge of the second blade to a back side of the first blade.

17. The chopping method of claim 12, further comprising for each of the plurality of blade pairs during each rotation of the first and second chopper drums, contacting the acute end of the straight beveled cutting edge of the second blade to a back side of the first blade.

18. The chopping method of claim 12, further comprising during each rotation of the first and second chopper drums, contacting the acute end of the straight beveled cutting edge of the second blade to a back side of the first blade.

* * * * *